Feb. 11, 1936.  A. B. KINZEL  2,030,640
PORTABLE TESTING MACHINE
Filed Sept. 28, 1929  2 Sheets-Sheet 2
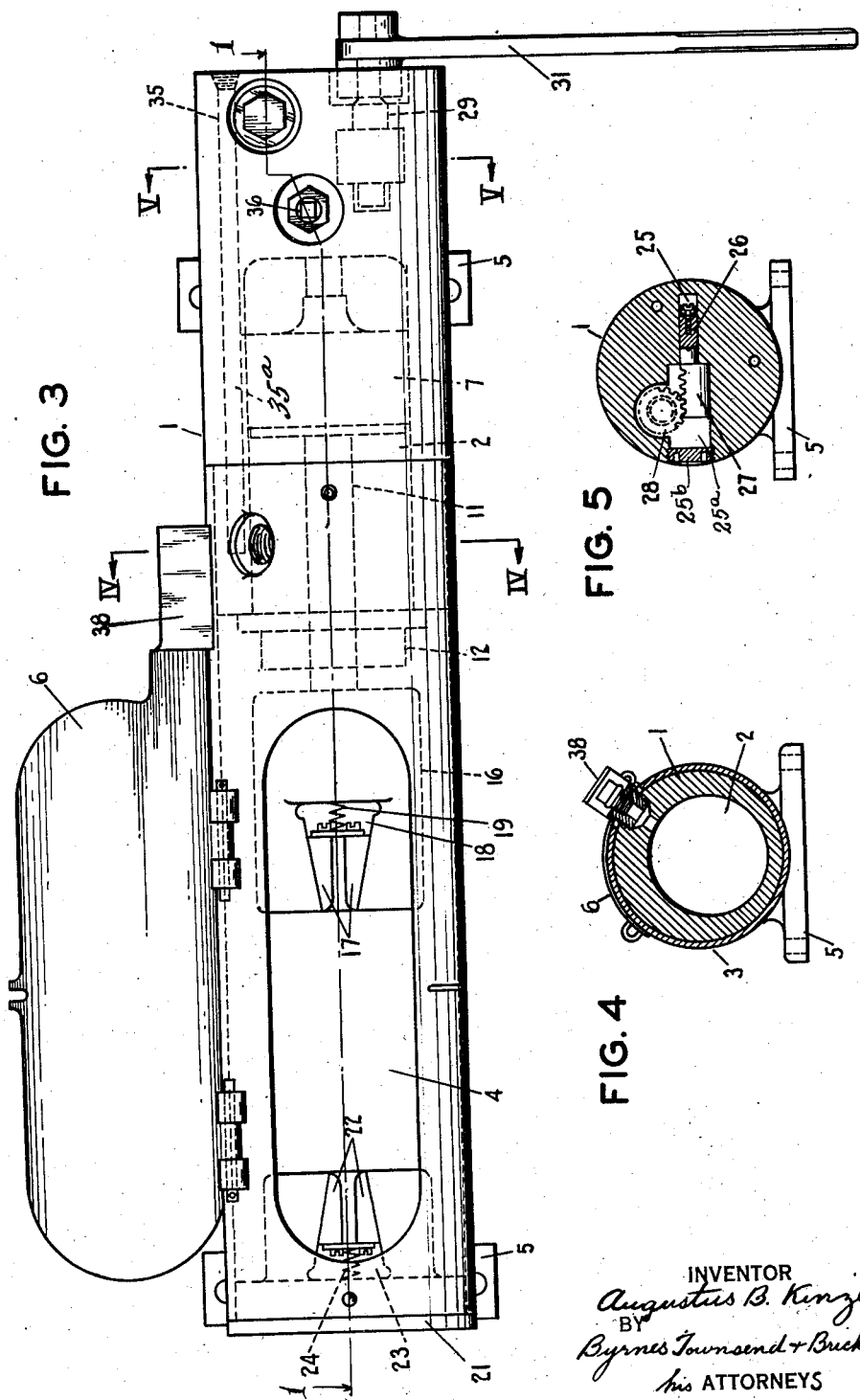
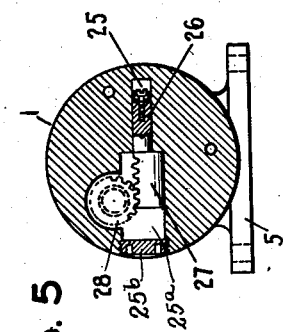
INVENTOR
Augustus B. Kinzel
BY
Byrnes Townsend + Bruckenstein
his ATTORNEYS Patented Feb. 11, 1936

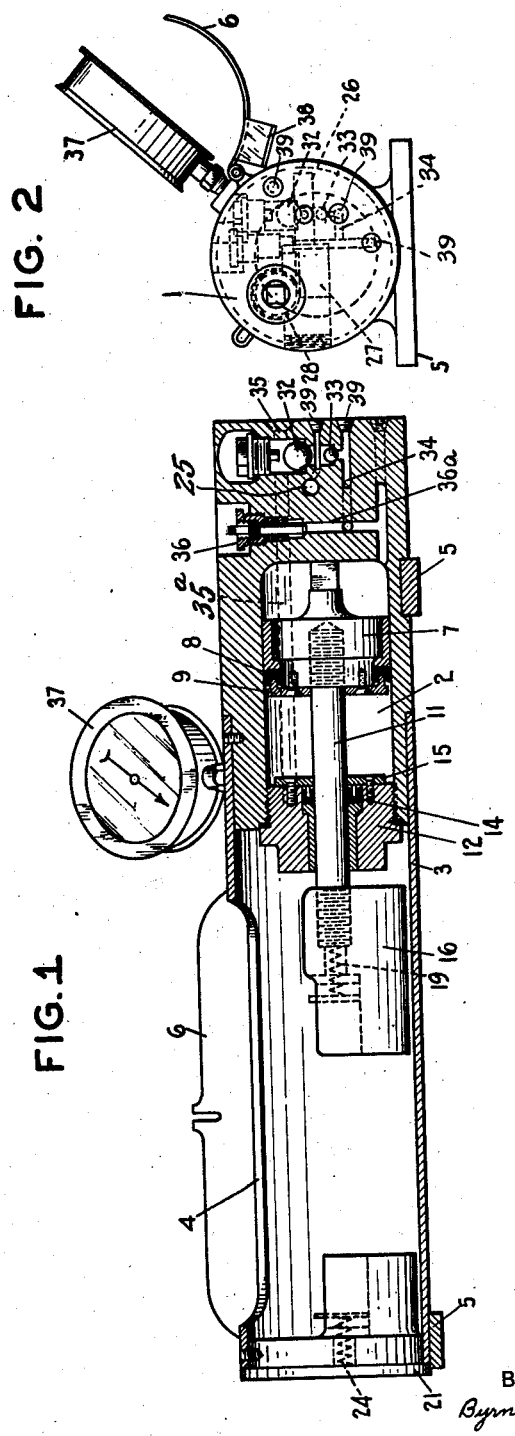

2,030,640

UNITED STATES PATENT OFFICE 2,030,640

PORTABLE TESTING MACHINE

Augustus B. Kinzel, Beechhurst, N. Y., assignor, by mesne assignments, to Union Carbide and Carbon Corporation, a corporation of New York Application September 28, 1929, Serial No. 395,923

13 Claims. (Cl. 265—14)

My invention relates to physical testing machines and particularly to portable forms thereof. It has for an object the production of a small, compact, portable testing machine adapted to the operations of determining the physical properties of metal or other material specimens. It has for other objects a rearrangement and simplification of parts for the production of a lighter, simpler and less expensive testing machine, and the production of a more rugged and convenient device, suitable for application broadly of the usual testing methods and procedures, and particularly for testing and determining the characteristics of materials when under tensile stress.

The testing of specimens by the application of tensile stresses to the ends of test pieces until they are pulled apart, is a standard and well known procedure. It has, however, been customarily conducted with very elaborate and expensive machinery, adapted to use only after being permanently erected in a suitable location. These machines are cumbersome and slow of operation.

My invention provides a simple, inexpensive, machine sufficiently small to be readily portable, but with such a distribution of metal and members as to be sufficiently strong for the testing of high grade materials. For this purpose my machine embodies a new arrangement of a hydraulic cylinder and piston device within a strong metal body block, with a simple and convenient hydraulic pump mechanism connected to the cylinder by channels in the metal body. The piston is provided with a piston rod and appropriate fluid tight packing members, and a specimen holding device for mounting specimens is attached to the end of the piston rod. The compression stresses incident to tension upon the test sample are taken by a tubular member within which the test specimen is mounted. This tube is attached to the cylindrical block at one end and provided with a second jaw member at the other end. The utilization of a single metal block for power cylinder and pump, with a coaxial tubular member containing the test specimen and taking the stresses during the testing makes a most efficient use of the metal therein, and the device will stand the stresses required for testing with a substantial margin of safety.

By this means I am enabled to obtain the above mentioned objects, and to produce a highly convenient, inexpensive and useful portable tensile strength testing machine.

Other objects and structural details of my invention will be apparent from the following description when read in connection with the accompanying drawings wherein:

Fig. 1 is a view in vertical section of my device on line I—I of Fig. 3;

Fig. 2 is a diagrammatic end view of my device;

Fig. 3 is a top view, partially diagrammatic, of my device;

Fig. 4 is a view in vertical transverse section along the lines IV—IV of Fig. 3; and Fig. 5 is a view in vertical transverse section along the lines V—V of Fig. 3.

In constructing my device I provide a cylinder block or body member I, as shown in the figures, within which is bored a cylinder 2. The block I is turned down to a reduced diameter at the end near the cylinder bore opening to provide a shoulder, and to enter the end of a tubular member 3, which rests against the shoulder. The tube 3 is provided with a side opening 4 for the insertion and withdrawal of the test specimens. Pedestal members 5 are attached to the cylinder block and tube as shown, and a cover 6 is provided and hinged to the tube 3, adapted to swing over and cover the opening 4.

The cylinder 2 is desirably bored with its axis parallel to the axis of the cylinder block I. The axis of the bore may coincide with the axis of the block, but I find it desirable to position the bore with its axis slightly displaced sidewise from the axis of the cylinder block. This is preferable because of the presence of the side opening 4 in the tube, which reduces the strength slightly on one side of the tube, the sidewise displacement of the bore 2 being utilized to adjust the stresses according to the strength of the various parts of the tube.

The cylinder 2 is provided with a piston 7 which is equipped with a fluid tight packing member 8 such as a cup pump leather, and a follower plate 9. A piston rod II is attached to the piston 7 in any convenient way, as by a screw thread.

A cylinder head 12 is provided and attached to the block I within the cylinder bore 2 by any convenient means, as by a screw thread. A fluid tight packing member 14, which may also be a pump leather, is provided in the cylinder head 12 around the piston rod II and held in place by a follower plate 15.

A specimen holding member 16 is also provided and attached to the piston rod II. It is desirably provided with a pair of wedge shaped jaws or grip members 17 working within a tapered opening 18 and pressed forward by a spring 19.

The end of the tube 3 opposite the power cylinder bore 2 is provided with a specimen holding member 21 also having grip members 22 in a tapered opening 23, provided with a spring 24 to press the jaws forward.

A hydraulic pump device is provided, which may be positioned within a portion of the body member 1. This may consist of a cylinder 25 bored in the body metal, within which is positioned a piston 26 attached to a rack member 27 adapted to operate within a counter-bore 25a closed by a screw plug 25b. A gear member 28 meshes with the rack member 27, and is carried upon a shaft 29 with an end projecting outward, upon which is mounted a handle 31. The intake to the pump cylinder 25 comprises a passage 34 which extends from one end of the power cylinder 2 to the pump cylinder. A ball check valve 33 is placed in passage 34 to prevent the backward flow of liquid in this line. The discharge line from the pump 25 comprises a passage 35a which receives the discharge liquid from the pump chamber through a non-return check valve 32, and a port 35 communicating with the outlet from the valve. The outlet from the passage 35a is adapted to discharge liquid into the power cylinder 2 at its rear end adjacent the cylinder head 12. A bypass between the intake and discharge sides of the pump 25 is provided by a bypass valve 36, one side of which communicates with the discharge passage 35a and the other side of which communicates with passage 36a which in turn communicates with the intake passage 34. The ends of the bored passages terminating in the outer wall of the body 1 are threaded and closed with screw plugs 39.

A calibrated pressure gage 37 is provided and connected to the cylinder space between the piston 7 and cylinder head 12. The cylinder space 2 is practically completely filled with a suitable hydraulic fluid such as glycerine or oil including both the space between the piston 7 and the cylinder head 12, and the space between the piston 7 and the bottom of the cylinder bore, as well as the various channels and ports and the pump cylinder 25.

In the operation of my testing machine the specimen holding members 16 and 21 are brought to an appropriate separation, and the test piece inserted between the grips 17 and 22. If the members are more widely separated than is suitable for the test specimen, they may conveniently be brought together by opening the bypass valve 36 and removing the handle 31 from the shaft 29 and inserting the small end through the opening 4 behind the member 16. It may then be operated as a lever fulcruming against the edge of the opening 4 to move the member 16 toward the member 21. The bypass valve 36 may then be closed and the handle 31 replaced, and operated to force the oil from the bottom of the cylinder bore through the passage 34, the check valve 33, the pump cylinder 25, the check valve 32 and the passage 35a to the cylinder space 2 between the piston 7 and the cylinder head 12. This tends to force the piston away from the cylinder head and to pull the jaws 16 and 21 apart, causing the grips 17 and 22 to hold the test specimen firmly and apply the desired tensile stress thereto.

The pressure of the oil in the cylinder 2 is communicated to the gage 37 which is desirably calibrated to indicate directly the total pull produced by the piston and its associated members upon the specimen under test. Alternatively, the gage may read pounds pressure per square inch and the total pull upon the specimen may be computed by multiplying the pounds pressure per square inch by the effective area in square inches of the piston 7.

Appropriate observations may be made upon the test specimen in the usual way during the time the handle 31 is operated and the tensile stress increased, until the breaking point is reached. This may be determined by observation of the gage, or by the use of a set pointer indicating the maximum position reached by the gage pointer.

The above described schedule of operations will obtain a value for the ultimate tensile strength of a specimen. The yield point may be obtained by operating the pump handle at a steady rate, a regular number of strokes per minute, and watching the gage reading. The pressure indicated by the gage increases steadily and in proportion to the number of strokes. When the yield point is reached, however, the pointer temporarily ceases to rise even though the pump is still stroked; the gage reading at this point indicating the yield point value. Alternatively, of course, record marks may be made upon the specimen and observations made of the ratio between the extension of the specimen and the stress applied.

The device of my invention may conveniently be constructed to have an over-all length of less than three feet, a diameter of less than eight inches and a weight within the carrying capacity of one man, to provide a maximum stress of 40,000 pounds, which is sufficient for the majority of tensile strength tests. Likewise, the device is readily portable, since the handle member 31 is easily detachable and the gage 37 may be conveniently removed. It is desirable when the gage is removed that the opening be closed with a temporary plug to prevent loss of oil from the hydraulic system. The cover 6 may then be closed. The cover 6 is desirably provided with an extension member 38 adapted to cover and protect the plug in the gage opening.

The use of the tubular member 3 to take the stresses is a highly advantageous feature of the device of my invention because of the superior strength of a tube per unit of material. Likewise, since I find it desirable to provide an opening in the tube member 3 for the insertion of the test specimen, it is also desirable, although not essential, to bore the cylinder 2 off center in a direction opposite to the opening 4, in order to reduce the stresses upon the tube at the side in which the opening is made.

Also, the use of the cylindrical block member 1 for the cylinder bore 2 permits of a maximum of strength with a minimum of material, and the enclosing of the hydraulic pump member within the same block simplifies and strengthens the device by avoiding the necessity of connecting tubes, etc.

While I have shown only one embodiment of my invention it will be understood that changes in the details thereof may be made without departing from the scope of my invention as defined in the appended claims.

I claim as my invention:

1. A portable testing machine comprising a tubular compression stress resisting member; a stress producing means secured to one end of said tubular member and having walls lying in prolongation of the walls of said tubular member; and means lying within said tubular member and connected to said stress resisting member and to said stress producing means respectively for stressing a specimen between said members.

2. A portable tensile testing machine comprising a tubular compression stress resisting member having an opening in its side for the insertion of a test specimen; a specimen gripping member attached to one end of said tubular stress resisting member; a stress producing means secured to the other end of said tubular member; and a specimen gripping member operated by said stress producing means, both of said specimen gripping members lying within said tubular member.

3. In a portable testing machine, the combination of a fixed and a movable head; an elongated chambered body having a tubular stress resisting member; said fixed head being carried by said tubular stress resisting member; a piston movably mounted in one chamber of said body and operatively connected to said movable head; a pump contained in another chamber of said body for delivering fluid pressure to the chamber receiving said piston; said piston chamber also providing storage space for said fluid; means for operating said pump; a conduit connecting the discharge from said pump to the space in said piston chamber on one side of said piston; a conduit connecting the inlet to said pump to the space in said piston chamber on the opposite side of said piston; a bypass passage around said pump; and a valve for opening and closing said bypass passage.

4. In a testing machine, the combination of a block having a cylindrical bore; a piston in said bore; a specimen-gripping member; means, comprising a rod, for connecting said member to said piston; a compression stress-resisting tube secured to said block; said tube having its axis parallel to the axis of said bore and having an opening in its side for the insertion and observance of a test specimen; a second specimen-gripping member secured in said tube and cooperating with the first-mentioned specimen-gripping member; and means for applying pressure to said piston to separate said specimen-gripping members.

5. In a testing machine the combination of a block having a cylindrical bore; a head for one end of said bore; a piston in said bore; a rod connected to said piston and projecting through said head; a compression stress-resisting tube secured to said block and having its axis parallel to the axis of said bore; a specimen-gripping member secured to said piston rod and adapted to operate within said tube; a second specimen-gripping member secured to said tube and cooperating with said first mentioned specimen-gripping member; and means for applying hydraulic pressure to said piston on the side from which said rod projects for separating said gripping members.

6. A tensile testing machine comprising a tube adapted to take compression stresses; a specimen holding member attached thereto and adapted to hold a test specimen within said tube; and a stress producing device also attached to said tube and having a member adapted to cooperate with a test specimen within said tube for the application of stresses thereto; said stress producing device comprising a block having a bore and a piston therein; said piston having a rod attached thereto; a specimen holding member attached to said rod; means for applying pressure to the side of said piston from which said rod projects; and said block having a shoulder adapted to cooperate with said tube.

7. A testing machine comprising a cylinder; a head for each end of said cylinder; a piston within said cylinder; a rod attached to said piston and extending through one of said cylinder heads; means for pumping fluid from one side of said piston to the other; a tubular compression stress-resisting member attached to said cylinder and having its axis parallel to and included within the projection of the bore of said cylinder; a gripping device attached to said piston rod; an abutment extending across said tubular member; a second gripping device attached to said abutment and in alignment with said first gripping device.

8. A testing machine comprising a cylinder; a head for each end of said cylinder; a piston within said cylinder; a rod attached to said piston and extending through one of said cylinder heads; means for pumping fluid from one side of said piston to the other; means for bypassing fluid around said pumping means from one side of said piston to the other; a tubular member attached to said cylinder and having its axis parallel to and included within the projection of the bore of said cylinder; a gripping device attached to said piston rod, an abutment extending across said tubular member; and a second gripping device attached to said abutment in alignment with said first gripping device.

9. A testing machine comprising a tubular stress resisting member having a pair of grip members therein adapted to operate upon a test specimen within said tubular member; means lying in the projection of the end of said tubular member for actuating one of said grip members; said grip members being displaced from the axis of said tube; said tubular member having a hand opening in the side of said tube at a point opposite the direction of displacement of said grip members.

10. A testing machine comprising a tubular stress resisting member having grip members therein adapted to operate upon a test specimen within sad tubular member; a cylinder and a piston therein lying in the projection of the end of said tubular member for actuating one of said grip members; said grip members being displaced from the axis of said tubular member; said tubular member having a hand opening at a point opposite the direction of displacement of said grip members; and a cover member hinged adjacent to said opening and adapted to swing thereover for the closure thereof; said tubular member and cylinder having coaxial openings therein forming an auxiliary opening; and said cover having an extension adapted to cover said auxiliary opening.

11. A testing machine comprising a stress resisting tube; grip members therein adapted to operate upon a test specimen within said tube; means lying in the projection of the end of said tube for actuating one of said grip members; said tube having a hand opening at a point adjacent said grip members; and a cover member hinged adjacent to said opening and adapted to swing thereover for the closure thereof, said tube having an auxiliary opening therein; and said cover having an extension adapted to cover said auxiliary opening.

12. A portable testing machine comprising a tubular stress-resisting member; a head secured to said tubular member; a gripping device within said tubular member and secured to said head; stress-producing means carried by said tubular member; and a gripping device connected to said stress-producing means and disposed within said tubular member in alignment with the gripping device secured to said head.

13. A portable testing machine comprising a tubular stress-resisting member; a stationary head secured to said tubular member adjacent one end thereof; a stationary gripping device within said tubular member and secured to said head; movable stress-producing means mounted adjacent the other end of said tubular member; a gripping device connected to and movable by said stress-producing means and disposed within said tubular member in alignment with said stationary gripping device, said tubular member having an opening through which said gripping devices are accessible for the insertion and removal of a test specimen; and means adapted to apply pressure to said stress-producing means to move the latter and the gripping device connected thereto.

AUGUSTUS B. KINZEL.